United States Patent
Stok et al.

(10) Patent No.: US 12,478,151 B2
(45) Date of Patent: Nov. 25, 2025

(54) MULTI-LAYER OF DECORATIVE FACETED FASHION JEWELLERY STONES FOR TECHNICAL USE

(71) Applicants: Pavel Stok, Liberec (CZ); Pavel Zadrazil, Turnov (CZ); Petr Franc, Simonovice (CZ); Martin Novotny, Liberec (CZ); Stanislava Stará, Liberec (CZ)

(72) Inventors: Pavel Stok, Liberec (CZ); Pavel Zadrazil, Turnov (CZ); Petr Franc, Simonovice (CZ); Martin Novotny, Liberec (CZ); Stanislava Stará, Liberec (CZ)

(73) Assignee: Preciosa, a.s., Jablonec nad Nisou (CZ)

( * ) Notice: Subject to any disclaimer, the term of this patent is extended or adjusted under 35 U.S.C. 154(b) by 979 days.

(21) Appl. No.: 17/411,755

(22) Filed: Aug. 25, 2021

(65) Prior Publication Data
US 2022/0061479 A1   Mar. 3, 2022

(30) Foreign Application Priority Data
Aug. 25, 2020   (CZ) ................ CZ2020-473

(51) Int. Cl.
A44C 17/00   (2006.01)
A44C 27/00   (2006.01)
C03C 17/00   (2006.01)

(52) U.S. Cl.
CPC .......... *A44C 17/001* (2013.01); *A44C 17/007* (2013.01); *A44C 27/005* (2013.01); *C03C 17/009* (2013.01); *C03C 2217/72* (2013.01)

(58) Field of Classification Search
CPC ... A44C 17/001; A44C 17/007; A44C 17/008; A44C 17/00; A44C 27/005; A44C 27/007; A44C 27/00; C03C 17/009; C03C 2217/72
See application file for complete search history.

(56) References Cited

U.S. PATENT DOCUMENTS

| | | |
|---|---|---|
| 5,535,056 A | 7/1996 | Caskey et al. |
| 6,231,196 B1 | 5/2001 | Mahachek |
| 2015/0052946 A1* | 2/2015 | Reid, II ............ A44C 27/00 63/26 |

FOREIGN PATENT DOCUMENTS

| | | |
|---|---|---|
| EP | 1792553 A2 | 6/2007 |
| GB | 2276071 A | 9/1994 |
| WO | WO 2019/158535 A1 | 8/2019 |

* cited by examiner

*Primary Examiner* — Michael P Wieczorek
(74) *Attorney, Agent, or Firm* — Reinhart Boerner Van Deuren P.C.

(57) ABSTRACT

A final layer of a multi-layer of thin deposit and lacquer layers of a decorative faceted functional stone formed by 10 to 35% of nano/colloidal silica, optionally nano/colloidal alumina, 30 to 50% of encapsulated aluminium flakes in grain size of 15-80 µm, 2 to 10% of $Fe_3O_4$ in grain size of 3-50 µm, and 10 to 40% of polyisocyanate-hardened mixture of epoxy and polyether resin, and a method for increasing the opacity and hardness of a multi-layer of thin deposit and lacquer layers of a decorative faceted functional stone by applying this final layer.

14 Claims, 1 Drawing Sheet

MULTI-LAYER OF DECORATIVE FACETED FASHION JEWELLERY STONES FOR TECHNICAL USE

FIELD OF THE INVENTION

The present invention relates to increasing functionality of a multi-layer of decorative faceted fashion jewellery stones used as decorative and at the same time functional elements in components of small switches, sensors or mechanical flaps or parts. Besides their aesthetic benefits, the fashion jewellery stones serve at the same time as protection covers of small parts in the interior equipment. In order to expand their use, it is necessary to ensure resistance of the multi-layer against mechanical strain given by vibrations in working the parts and a full coverage of the substrate, while maintaining high optical and aesthetic characteristics of the parts.

PRIOR ART

Jewellery and fashion jewellery stones and their imitations have already surpassed the traditional uses in jewellery and textile industry, and they have been smoothly implemented into more technical fields of industry as functional elements with an aesthetic value. Fashion jewellery with backlit stones, serving as functional components of technical designs, such as interior mirrors or lighting fixtures, is launched on the market—e.g. patent GB 2276071 A. At the same time, 3D complex faceted structures are launched on the market, which fully adapt to the requirements of functionality with their shape. The trend in increasing the aesthetic value of covers has reached into all interiors of households and cars. The subject-matter of this patent is the adaptation of the traditional multi-layer of coloured and highly reflective mirrors of the fashion jewellery segment for technical segments with higher standards for chemical and mechanical resistance of products. The application of a new functional layer, based on nano/colloidal silica or alumina and encapsulated aluminium pigment, brings full applicability in technical designs.

In general, faceted parts for these applications always consist of a front-visible side and a rear-non-visible side, which is often provided with a mirror or other opaque surface.

The front and back surfaces of a decorative functional stone can be faceted.

The actual decorative stones in this case are made from crystal glass, but they can also be made from coloured glass, jewellery stones such as cubic zirconia, glass-ceramics, acrylic glass, polycarbonates or other optically suitable polymers. An acceptable option is to use natural stones.

In case of glass, glass-ceramic and crystal stones, the front, visible surface may be provided with a layer of hydrophobic substances, forming a thin layer protective against leaving fingerprints and grease on the surface of the stone after contact, applied in vacuum or from vapours. The visible side can be provided at the same time with another layer (or a series of layers) modifying the optical-aesthetic or functional properties.

In order to achieve a high aesthetic value of the stone and at the same time to cover the non-visible parts of the switches or diodes, the rear surface of the stone is provided with a reflective layer protected by a multi-layer of lacquer layers. In case of functional light caps, part of the reflective layer can be removed, most often by laser engraving, to achieve the additional effect. In the de-engraved places, there is a local passage of light through the laser motif, such as described in U.S. Pat. No. 6,231,196 B1, or the element also serves as a functional, and a switch is built into the light source assembly behind the mirror as described e.g. in EP 1792553 A2.

Thin layers, applied to the back surface of the decorative functional stone, are formed for the purposes of technical designs mainly from Cr, Al, Si, Ge, Zr, Ti by commonly available PVD techniques. They can be applied to the surface both in the mode of pure elements or with the content of admixtures of up to 20% by weight, in our case e.g. 90% Si-10% Al, or 98% Si-2% In. In some cases, the possibility of reactive sputtering is preferably used to form coloured layers of oxides or nitrides, in case of the present invention most often ZIN, SiN, $TiO_2$, for selected technical designs it is possible to use any combination of multi-layers, often n-times $SiO_2$—$TiO_2$. The thicknesses of the deposited vacuum layers range from 200 nm to 2,500 nm.

The thickness of the deposited layers is determined by the material used, the geometry of the location and the distance of the deposited surface of the decorative functional stone from the source of deposited ions. Due to the shape complexity, some surfaces find themselves in the sputtering shadow during deposition, the layer thickness is not constant and the layer thicknesses fluctuate by as much as 50%. However, in visible light, this unevenness is not observable and does not affect the useful properties of the decorative functional stone, as has already been published, for example, in US 005535056 A.

For mechanical and chemical protection of vacuum layers, the multi-layer is further provided with a lacquer layer in the thickness of 4 µm-20 µm. The lacquer can be pigmented, for example, in the shade of the PVD layer itself. One-component and two-component lacquers based on polyurethanes, acrylates, UV-curable lacquers, sol-gel layers, etc. are commonly used for lacquering this type of deposited thin layers. It is thus possible to achieve corrosion resistance parameters meeting the required standards, e.g. DIN ISO 9022-2.

In specific uses of decorative faceted functional stones as decorative and at the same time functional elements of small switches, sensors or mechanical flaps and parts, the parameters of such a cover layer may not always be enough to fulfil the mechanical hardness requirements of the cover layers. This is especially significant for parts that are highly exposed to vibrations in the assembly of the entire component. The coverage capacity of the multi-layers in the immediate vicinity of the light passage through the laser-removed parts of the plating is also insufficient.

SUMMARY OF THE INVENTION

The subject-matter of the present invention is the addition of a new functional layer "PC nanosial" to the usual multi-layer of thin vacuum layers protected by commercial polymeric lacquers. The new functional cover layer is based on a content of 10-35% nano/colloidal silica in the grain size of 50 nm to 1000 nm, or optionally 10-35% nano/colloidal alumina in the grain size of 50 nm to 400 nm to ensure extreme surface hardness in thin films of multi-layer deposit layers, 30-50% encapsulated aluminium flakes in the grain size of 15-80 µm, 2-10% Fe3O4 in the grain size 3-50 µm, and 10-40% polyisocyanate-hardened mixture of epoxy and polyether resins.

The resulting layer is applied to the top polymer lacquer protecting thin vacuum deposits and is able to achieve extreme coverage against the passage of light when added in the thickness from 2 μm, thus ensuring perfect opacity of the layers even in small details around engraved symbols and at the same tine excellent combination of hardness and toughness, excellent properties for laser engraving and subsequent good adhesiveness even with a total thickness of all layers of about 4 μm.

The light transmittance value for the functional multi-layer on the back of the faceted stone is determined by measuring the brightness at the lumen under constant light conditions. For standard multi-layers, it is within the range of about 10,000 cd/m$^2$, which is mentioned for example in WO 2019158535 A1. Compared to the reference sample, the use of the "PC nanosial" layer brings a significant decrease for the values of transmitted light. Under the measurement conditions in a room illuminated by about 0.5 lux, the reference values are up to 12,000 cd/m$^2$, while for a sample provided with a "PC nanosial" layer, the lumen cannot be measured even when using a light emitter with a value of 64,000,000 cd/m$^2$, and was therefore set at the level of at least 64,000,000 cd/m$^2$. Although multiple sources were tried, the brightness of the illumination could not be determined. The above-mentioned measurement shows approximately 5,000 times better resistance of the multi-layer to translucency when applying the "PC nanosial" layer compared to the comparative sample without the application of this layer.

The mechanical properties of the multi-layer were measured according to the CSN EN ISO 14577-4 standard. The test method is intended for metallic and non-metallic coatings, it is an instrumented penetration test for determining hardness and material parameters. Comparative hard coatings reached values of 140-160 MPa when measured. When applying the new functional layer "PC nanosial" at the end of the entire layer, the measured value of the samples varies in the region of 300-420 MPa.

The invention relates to a method of increasing opacity of a multi-layer of thin deposit and lacquer layers of decorative faceted functional stone with a new functional layer "PC nanosial". The layer is applied after the previous lacquer layers have been applied. Due to the use of a two-component mixture of epoxy and polyether resin hardened with polyisocyanate as a carrier binder, the spray-coating deposition technique was used in this case. When maintaining the ratio of 10-35% nano/colloidal silica, or optionally 10-35% nano/colloidal alumina to ensure extreme surface hardness of the surface of the multi-layer of thin deposit layers, 30-50% encapsulated aluminium flakes in the grain size of 15-80 μm, 2-10% $Fe_3O_4$ in the grain size 3-50 μm, and 10-40% polyisocyanate-hardened mixture of epoxy and polyether resins, extreme coverage against the passage of light and increase in hardness is achieved in thicknesses about 2 μm.

Tempering the layers occurs at the range of 130° C. to 200° C. for 30 to 120 minutes.

The layer is applied on the back surface of the faceted decorative functional stone by various lacquering techniques, such as spray coating, screen printing, roller coating, dip coating depending on the shape and size of the decorated part, while the layer can be applied directly to thin reflective layers or to wet layers of previous lacquer films, but also separately after complete termination of the previous multi-layer.

EXAMPLES OF EMBODIMENTS OF THE INVENTION

Example 1

Figure 1:
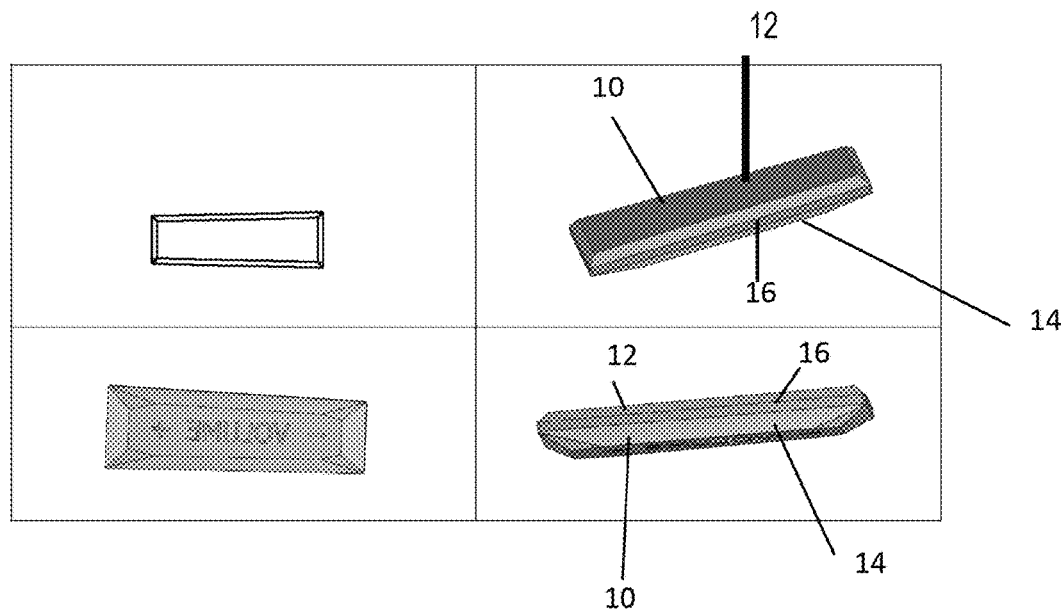
FIG. 1 shows a drawing of a decorative faceted trapezoid 10, the lower grey part 14 of the surface being the non-visible side treated by vacuum plating and lacquering, the upper blue surface 12 being the visible, glass side with parting line 16 therebetween.

Sodium-silica polished trapezoids of glass thickness of 5.4 mm and sizes a=45 mm, b=11 mm, c=9 mm, were faceted on one side (see FIG. 1). The whole part was washed to optical quality and subsequently the non-visible, faceted side was plated with a layer of silicon by magnetron sputtering. The final layer thickness in the central area was 650 nm, on leaning facets the thickness was approximately 600 nm. The unevenness of the vacuum-sputtered layer is given by the geometry of the stone and fully corresponds to technological practice. This unevenness does not affect the resulting optical-aesthetic value of the perceived colour and quality of the plating.

Subsequently, the discs were coated by pigmented spray of a two-component polyurethane lacquer (Tikkurila Temadur) in a thickness of about 8,000 nm. The group of samples, marked as "Sample 1", was finalized this way.

The group of samples marked as "Sample 2" was, after drying the previous layer, coated by further spraying by a new functional layer "PC nanosial" in the thickness of about 4,000 nm with the composition of 25% colloidal silica, 45% encapsulated aluminium flakes with a grain size of 30-80 μm, 5% Bayer Bayferrox 316 pigment ($Fe_3O_4$) and 25% polyisocyanate-hardened mixture of epoxy and polyether resin (Hexion Epikote Resin 240+BASF Lupranol 2048, hardened by Bayer Desmodur L 75).

The light transmittance was tested on the samples by measuring the brightness-detection by a camera system for lumen under constant light conditions.

TABLE 1

| Sample 1 | | |
|---|---|---|
| measured exposure [lux] at a distance of 350 mm | calculated exposure [cd/m2] | conditions |
| 20 | 12 700 | dusk (ambient exposure 0.5 lux) |
| 5 | 3 200 | dark (ambient exposure 0 lux) |

TABLE 2

| Sample 2 | | |
|---|---|---|
| measured exposure [lux] at a distance of 350 mm | calculated exposure [cd/m2] | conditions |
| 100 000* | 64 000 000 | dark (ambient exposure 0 lux) |

*the value determined by the fact that no light signal was detected at the used source Dolan-Jenner Fiber-Lite Mi-150. No light signal was detected behind the sample for other tested light emitters (bulb-7 000 000 cd/m$^2$, solar disc~1E9 cd/m$^2$).

Due to the fact that the samples Sample 1 and Sample 2 differed from each other only by the added new functional layer "PC nanosial", the above-measured values show a significant contribution of the layer to the light insulation of the multi-layer. Three sources were tested during the measurement, but no light could be detected at any of them, so the value of light transmission through the multi-layer was set to a brightness value of 64,000,000 cd/m$^2$ (Dolan-Jenner Fiber-lite Mi-150 lightsource).

The increase in mechanical resistance is characterized by the measurement of micro-hardness according to the standard CSN EN ISO 14577-4. At a load of 20 mN, a load time of 40 s and a relaxation time of 10 s, the corresponding Martens hardness values (HM) are calculated from the penetration depth of a diamond pyramid. Table 3 compares the micro-hardness for both surface treatments-samples (a set of five samples) that were finished without the new functional layer "PC nanosial" as Sample 1, samples (a set of five samples) that were finished with the new functional layer "PC nanosial" are considered as Sample 2.

TABLE 3

| Paint hardness according to Martens | lacquering Sample 1 MPa | lacquering Sample 2 MPa |
| --- | --- | --- |
| Sample 1 | 145.7 | 313.6 |
| Sample 2 | 139.8 | 402.1 |
| Sample 3 | 160.2 | 324.5 |
| Sample 4 | 153.7 | 291.3 |
| Sample 5 | 149.1 | 325.4 |

The numeric values are an average of three measurements on each sample piece.

The analysis of reached values shows the benefit of the increased mechanical resistance of the layers; compared to the reference values of samples marked as Sample 1, ranging from 140 to 160 MPa, the micro-hardness of coatings of the samples group with the application of the final "PC nanosial" layer marked as Sample 2 ranges from 300 to 420 MPa. The application of the new functional layer therefore results in at least 2 times higher hardness than with an untreated lacquer. Films protected with the "PC nanosial" layer are therefore extremely hard while maintaining excellent adhesiveness in all applications.

For final use, the samples were subsequently laser-engraved with the symbols+VOLUME−, and these were overprinted in white colour (MARABU SR white) to hide the view on the electronic device of the component under the plated glass decorative stone. The installation included a test touch panel with a contact illumination function. A decorative stone was placed on this panel so that the non-visible (plated, lacquered, faceted) side of the stone lay on the test panel, the visible, untreated side of the stone served as a touch button. Samples marked as Sample 1 and Sample 2 surface treatment were tested side by side in the installation. The tested functionality of sensing the exact signal of touch points under the glass stone on the touch panel was only minimally affected by the insertion of the stone into this installation, in both variants of the surface treatment the full sensitivity to touch was maintained. The only difference was the sharpness of the contours of the laser characters as the light coming from the base panel passed. The Sample 2 surface treatment variant with the application of the "PC nanosial" functional layer had a clearer interface between the font line and the surrounding layer, compared to the Sample 1 variant, where the sharp font contours were replaced by a rather diffuse transition.

Example 2

Figure 2:
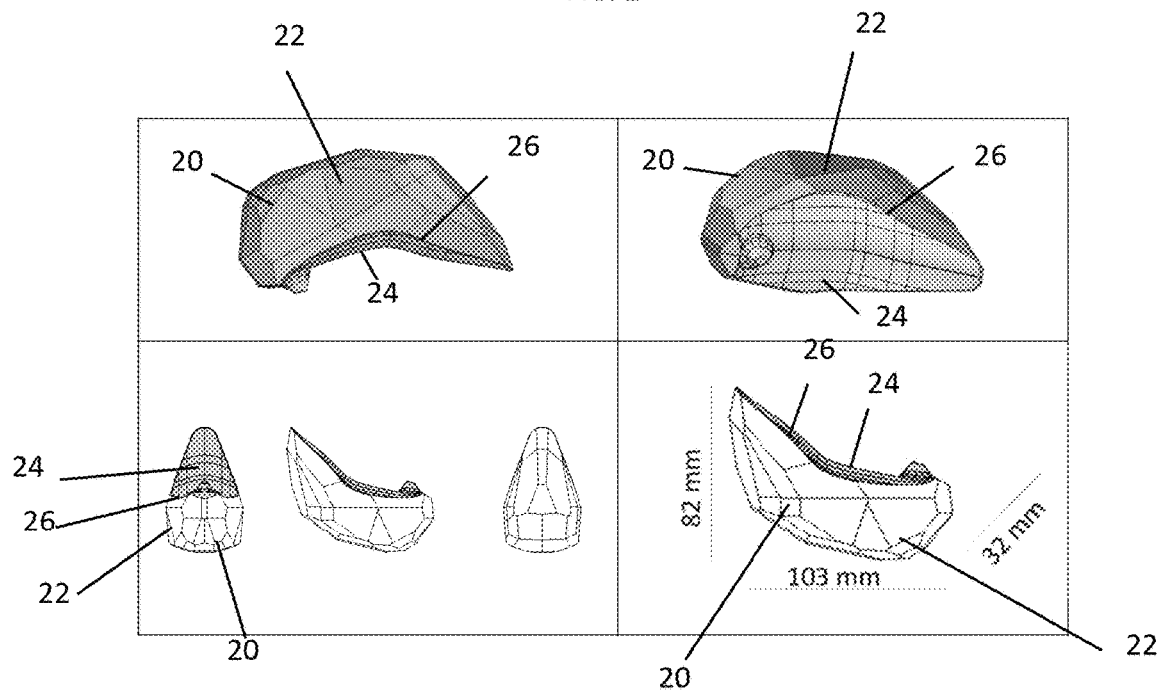
FIG. 2 shows a drawing of a one-sided decorative faceted, polished 3D shape 20 serving as a cover for an automatic mode selector of a passenger car, the lower grey part 24 of the surface indicating the non-visible side treated by vacuum plating and lacquering, the blue and unpainted upper surface 22 being the visible, glass part with parting line 26 positioned therebetween.

Sodium-silica partially polished complex 3D shape with a glass thickness of 103*82*32 mm was partially decoratively faceted (see FIG. 2). The lower non-visible side also contained a small locking pin used to accurately position the glass part in the installation. The whole part was washed to optical quality and subsequently the non-visible, non-faceted side was plated with a multi-layer system of silicon, aluminium, their mixtures and oxides by magnetron sputtering. The final thickness of the layer in the central area was in the range of 500-600 nm depending on the position; on leaning facets around the locking pin the thickness was approximately 700 nm. The unevenness of the vacuum-sputtered layer is given by the geometry of the stone and fully corresponds to technological practice. This unevenness does not affect the resulting optical-aesthetic value of the perceived colour and quality of the plating.

Subsequently, the 3D part was lacquered by pigmented spray of a two-component polyurethane lacquer (Tikkurila Temadur) in a thickness of about 12,000 nm, and after the previous film has dried, lacquered by further spraying of a new functional layer "PC nano black Sial" in a thickness of about 3,000 nm with a composition of 25% colloidal silica, 45% encapsulated aluminium flakes with a grain size of 30-80 μm, 5% pigment Bayer Bayferrox 316 ($Fe_3O_4$) and 25% polyisocyanate-hardened mixture of epoxy and polyether resin (Hexion Epikote Resin 240+BASF Lupranol 2048, hardened by Bayer Desmodur L 75)—i.e. with the application of the functional layer "PC nanosial". After curing of the lacquer system, the paint was engraved by laser; the symbols of the modes of the automatic gear lever were inscribed for the test of aesthetic quality in the passage of light. These were overprinted in white colour (MARABU SR white) to hide the view on the light panel on which the glass part was placed in the installation.

The part was inserted in a test installation of the gear lever of a passenger car and backlit with white light with a luminous flux intensity of 700 lm. The interface between the font line and the surrounding layer was sharp, and the contours of the font were clearly legible. Mechanical-vibration loading confirmed the excellent scratch resistance of the coating; no damage was detected in the tested samples.

Due to the high quality requirements for automotive interior parts, the glass 3D shape designed for use as part of the mode selector of the gear lever, refined as described above, was tested for the required strengths with the outputs summarized in Table 4.

TABLE 4

| | test specification | specification by norm | assessment |
| --- | --- | --- | --- |
| 1. | Heat resistance | CSN EN 60068-2-2 | satisfies |
| 2. | Cyclical environmental aging | PV 1200 | satisfies |
| 3. | Light resistance | PV 1303 | satisfies |
| 4. | Sunlight resistance | DIN 75220-D-INI-T | satisfies |
| 5. | Low-temperature aging | CSN EN 60068-2-1 | satisfies |
| 6. | Flammability test | TL 1010 I SOP-VZK-16 | satisfies |

INDUSTRIAL APPLICABILITY

The subject of usability are decorative stones made of materials such as crystal glass, coloured glass, jewellery materials such as cubic zirconia, glass-ceramics, acrylic glass, or even fully natural materials which are partially metallized with various types of vacuum multi-layers, lacquered and subsequently modified with the added new functional layer "PC nanosial" according to the present invention. The subject-matter of the patent is a new functional layer, significantly increasing the possibility of using stones as various decorative covers for electronic or mechanical switches and sensors, thanks to a significant increase in mechanical resistance to paint scratches when used in switch installations and increased luminous flux shielding, which allows the use of very strong light sources in lighting the switch without losing the functionality of the switch or shortening its life. The possibilities of using this layer are connected with decorative stones as parts of covers and switches, which can be used in the field of interior switches in households, bathrooms, various decorative devices, but also in the interiors of cars and other vehicles.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of increasing the opacity of a multi-layer of thin deposit and lacquer layers of a decorative faceted functional stone characterised in that a final layer formed by 10 to 35% of nano/colloidal silica or nano/colloidal alumina, 30 to 50% of encapsulated aluminium flakes in grain size of 15-80 μm, 2 to 10% of $Fe_3O_4$ in grain size of 3-50 μm, and 10 to 40% of polyisocyanate-hardened mixture of epoxy and polyether resin is applied to the back side of the functional decorative stone as the final layer of the multi-layer consisting of a thin reflective layer and covering lacquer layers either directly to the thin reflective layers, or to a previous lacquer layer, the multi-layer having a thickness from 4 μm to 20 μm.

2. The method of increasing the opacity of a multi-layer of thin deposit and lacquer layers of a decorative faceted functional stone according to claim 1 characterised in that the achieved opacity is at least 60,000,000 $cd/m^2$.

3. The method according to claim 2 characterised in that the final layer is applied on the back surface of the faceted decorative functional stone by one or more of the following lacquering techniques: spray coating, screen printing, roller coating, dip coating depending on the shape and size of the decorated part, while the final layer can be applied directly to thin reflective layers or to wet layers of previous lacquer films, but also separately after complete termination of the previous multi-layer.

4. The method according to claim 2 characterised in that it includes the step of tempering of layers, occurring in the range of 130° C. to 200° C. for 30 to 120 minutes.

5. The method according to claim 1 characterised in that the final layer is applied on the back surface of the faceted decorative functional stone by one or more of the following lacquering techniques: spray coating, screen printing, roller coating, dip coating depending on the shape and size of the decorated part, while the final layer can be applied directly to thin reflective layers or to wet layers of previous lacquer films, but also separately after complete termination of the previous multi-layer.

6. The method according to claim 1 characterised in that it includes the step of tempering of layers, occurring in the range of 130° C. to 200° C. for 30 to 120 minutes.

7. The method according to claim 1, wherein the 10 to 35% of nano/colloidal silica or nano/colloidal alumina is 10 to 35% of nano/colloidal silica.

8. A method of increasing the hardness of a multi-layer of thin deposit and lacquer layers of a decorative faceted functional stone characterised in that a final layer formed by 10 to 35% of nano/colloidal silica or nano/colloidal alumina, 30 to 50% of encapsulated aluminium flakes in grain size of 15-80 μm, 2 to 10% of $Fe_3O_4$ in grain size of 3-50 μm, and 10 to 40% of polyisocyanate-hardened mixture of epoxy and polyether resin is applied to the back side of the functional decorative stone as the final layer of the multi-layer consisting of a thin reflective layer and covering lacquer layers, the multi-layer having a thickness from 4 μm to 20 μm.

9. The method of increasing the hardness of a multi-layer of thin deposit and lacquer layers of a decorative faceted functional stone according to claim 8 characterised in that the hardness of the layers is from 300 to 420 MPa.

10. The method according to claim 9 characterised in that the final layer is applied on the back surface of the faceted decorative functional stone by one or more of the following lacquering techniques: spray coating, screen printing, roller coating, dip coating depending on the shape and size of the decorated part, while the final layer can be applied directly to thin reflective layers or to wet layers of previous lacquer films, but also separately after complete termination of the previous multi-layer.

11. The method according to claim 9 characterised in that it includes the step of tempering of layers, occurring in the range of 130° C. to 200° C. for 30 to 120 minutes.

12. The method according to claim 8 characterised in that the final layer is applied on the back surface of the faceted decorative functional stone by one or more of the following lacquering techniques: spray coating, screen printing, roller coating, dip coating depending on the shape and size of the decorated part, while the final layer can be applied directly to thin reflective layers or to wet layers of previous lacquer films, but also separately after complete termination of the previous multi-layer.

13. The method according to claim 8 characterised in that it includes the step of tempering of layers, occurring in the range of 130° C. to 200° C. for 30 to 120 minutes.

14. The method according to claim 8, wherein 10 to 35% of nano/colloidal silica or nano/colloidal alumina is 10 to 35% of nano/colloidal silica.

* * * * *